US012608938B2

(12) United States Patent (10) Patent No.: US 12,608,938 B2
Latapie et al. (45) Date of Patent: Apr. 21, 2026

(54) SELF-SUPERVISED LEARNING FOR VIDEO ANALYTICS

(71) Applicant: Cisco Technology, Inc., San Jose, CA (US)

(72) Inventors: Hugo Latapie, Long Beach, CA (US); Ozkan Kilic, Long Beach, CA (US); Adam James Lawrence, Pasadena, CA (US); Gaowen Liu, Austin, TX (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 543 days.

(21) Appl. No.: 17/986,234

(22) Filed: Nov. 14, 2022

(65) Prior Publication Data

US 2024/0161501 A1 May 16, 2024

(51) Int. Cl.
*G06V 20/40* (2022.01)
*G06V 10/72* (2022.01)
*G06V 10/764* (2022.01)

(52) U.S. Cl.
CPC .............. *G06V 20/44* (2022.01); *G06V 10/72* (2022.01); *G06V 10/764* (2022.01); *G06V 20/41* (2022.01)

(58) Field of Classification Search
CPC ........ G06V 20/44; G06V 20/41; G06V 20/52; G06V 10/72; G06V 10/764
See application file for complete search history.

(56) References Cited

U.S. PATENT DOCUMENTS

| | | | |
|---|---|---|---|
| 10,887,197 B2 | 1/2021 | Fenoglio et al. | |
| 10,965,516 B2 | 3/2021 | Fenoglio et al. | |
| 11,336,506 B1 | 5/2022 | Li et al. | |
| 11,594,043 B1 * | 2/2023 | Xu | G06F 16/284 |
| 11,989,020 B1 * | 5/2024 | Bagnell | G06N 3/045 |
| 12,071,161 B1 * | 8/2024 | Refaat | B60W 60/0015 |
| 2005/0180603 A1 | 8/2005 | Zoghlami et al. | |
| 2008/0069482 A1 | 3/2008 | Komiya | |
| 2010/0322516 A1 | 12/2010 | Xu et al. | |
| 2011/0051992 A1 | 3/2011 | Cobb et al. | |
| 2012/0063641 A1 | 3/2012 | Venkatesh et al. | |

(Continued)

FOREIGN PATENT DOCUMENTS

| | | |
|---|---|---|
| WO | WO-2015027289 A1 | 3/2015 |
| WO | WO-2019168323 A1 | 9/2019 |
| WO | WO-2021251062 A1 | 12/2021 |

OTHER PUBLICATIONS

Tao et al., Privacy-Preserved Behavior Analysis and Fall Detection by an Infrared Ceiling Sensor Network (Year: 2012).*

(Continued)

*Primary Examiner* — John B Strege
(74) *Attorney, Agent, or Firm* — Lee & Hayes, P.C.

(57) ABSTRACT

In one embodiment, a device represents spatial characteristics of an object depicted in video data over time as one or more timeseries. The device associates different portions of the one or more timeseries with behavioral regimes of the object. The device generates ground truth labels for frames of the video data based on changes in the behavioral regimes of the object associated with those frames. The device trains a self-supervised model to detect an event depicted in the video data using the ground truth labels and their associated frames.

20 Claims, 10 Drawing Sheets

(56) References Cited

U.S. PATENT DOCUMENTS

| | | | | |
|---|---|---|---|---|
| 2013/0174116 | A1 | 7/2013 | Pfeifer | |
| 2015/0186779 | A1 | 7/2015 | Deng et al. | |
| 2015/0347717 | A1* | 12/2015 | Dalal | G16H 20/30 |
| | | | | 434/258 |
| 2016/0105617 | A1 | 4/2016 | Kirkby et al. | |
| 2016/0328613 | A1 | 11/2016 | Gaidon et al. | |
| 2018/0033024 | A1* | 2/2018 | Latapie | G06V 20/53 |
| 2020/0251091 | A1 | 8/2020 | Zhao | |
| 2020/0319715 | A1 | 10/2020 | Holz | |
| 2021/0042532 | A1 | 2/2021 | Latapie et al. | |
| 2021/0174155 | A1 | 6/2021 | Smith et al. | |
| 2021/0225409 | A1 | 7/2021 | Lawlor | |
| 2021/0258652 | A1 | 8/2021 | Li et al. | |
| 2021/0279615 | A1 | 9/2021 | Latapie et al. | |
| 2021/0312773 | A1 | 10/2021 | Debnath et al. | |
| 2021/0390423 | A1 | 12/2021 | Latapie et al. | |
| 2021/0397849 | A1 | 12/2021 | Lin et al. | |
| 2022/0138509 | A1 | 5/2022 | Crosby et al. | |
| 2022/0245388 | A1* | 8/2022 | Hu | G06V 10/82 |
| 2023/0008567 | A1* | 1/2023 | Zikos | G06T 17/00 |
| 2025/0148771 | A1* | 5/2025 | Kozma | G06F 18/24133 |

OTHER PUBLICATIONS

Rougier et al. Monocular 3D head tracking to detect falls of elderly people (Year: 2006).*

Agrawal, et al., "VQA: Visual Question Answering", Proceedings of the IEEE International Conference on Computer Vision (ICCV), 2015, 25 pages, arXiv:1505.00468v7 [cs.CL].

Ahmed, et al., "Reflection Detection in Image Sequences", CVPR 2011, Jun./Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks. umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, JEEE.

D'Amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Jacob, et al., "A Demonstration of the Exathlon Benchmarking Platform for Explainable Anomaly Detection", Proceedings of the VLDB Endowment (PVLDB), Oct. 2021, 5 pages, HAL Open Science.

Jawed, et al., "Self-Supervised Learning for Semi-Supervised Time Series Classification", Pacific-Asia Conference on Knowledge Discovery and Data Mining, PAKDD 2020: Advances in Knowledge Discovery and Data Mining, May 2020, pp. 499-511, Lecture Notes in Computer Science, vol. 12084.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Lieto, et al., "Conceptual Spaces for Cognitive Architectures: A Lingua Franca for Different Levels of Representation", Biologically

(56) References Cited

OTHER PUBLICATIONS

Inspired Cognitive Architectures 19, May 2017, 17 pages, Cognitive Robotics and Social Sensing Lab.

Lin, et al., "Progressive Mirror Detection", 2020 IEEE/CVF Conference on Computer Vision and Pattern Recognition (CVPR), Jun. 2020, 9 pages, IEEE, Seattle, WA.

Ma, et al., "Granular computing and Dual Galois Connection", Information Sciences, 177(23), 2007, pp. 5365-5377, Elsevier Inc.

Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.

Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.

Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.

Pauli, Wolfgang, "Part I. General: (A) theory. Some relations between electrochemical behaviour and the structure of colloids", Jan. 1935, pp. 11-27, Transactions of the Faraday Society, vol. 1.

Scarselli, et al., "The Graph Neural Network Model", IEEE Transactions on Neural Networks (vol. 20, Issue: 1, Jan. 2009), pp. 61-80, IEEE.

Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "CODAM: A neural network model of consciousness", Neural Networks 20 (2007), pp. 983-992, Elsevier Ltd.

Thórisson, et al., "Cumulative Learning", Artificial General Intelligence—12th International Conference, AGI 2019, Proceedings, pp. 198-208, Springer.

Thórisson, Kristinn R., "A New Constructivist AI: From Manual Methods to Self-Constructive Systems", Chapter 9, Apr. 2012, pp. 147-174, Atlantis Press Book.

Thórisson, Kristinn R., "Integrated AI Systems", Minds & Machines 17, Mar. 2007, pp. 11-25.

Tonioni, et al., "Product recognition in store shelves as a sub-graph isomorphism problem", online: https://arxiv.org/abs/1707.08378, Sep. 2017, 14 pages.

Tripathy, et al., "Explaining Anomalies in Industrial Multivariate Time-Series Data with the Help of explainable AI", 2022 IEEE International Conference on Big Data and Smart Computing (BigComp), Jan. 2022, 8 pages, IEEE, Republic of Korea.

Unger, et al., "The Singular Universe and the Reality of Time: A Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, et al. "Self in NARS, an AGI System", vol. 5, Article 20, Mar. 2018, 15 pages, Frontiers in Robotics and AI.

Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: An Approach Based on Hierarchies of Concepts", I. Rival (Ed.), Ordered Sets, 1982, pp. 314-339.

Xue, et al., "Real-Time Anomaly Detection and Feature Analysis Based on Time Series for Surveillance Video", IEEE 5th International Conference on Universal Village • UV2020 · Session 3ABD-7, Oct. 2020, 7 pages, IEEE, Boston, MA.

Yao, et al., "A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

ML/DL MODEL

706

SELF-SUPERVISED MODEL TRAINING
704

ERRATIC

BASELINE

LABELED SAMPLES GROUND TRUTH

610

700

SELF-SUPERVISED LEARNING FOR VIDEO ANALYTICS

TECHNICAL FIELD

The present disclosure relates generally to computer networks, and, more particularly, to self-supervised learning for video analytics.

BACKGROUND

Video analytics techniques are becoming increasingly ubiquitous as a complement to new and existing surveillance systems. For instance, person detection and reidentification now allows for a specific person to be tracked across different video feeds throughout a location. More advanced video analytics techniques also attempt to detect certain types of events, such as a person leaving a suspicious package in an airport.

Traditionally, event detection within video feeds has relied on object detection and training a model to recognize a particular type of event using a large body of examples. Unfortunately, this means that there needs to be a sufficient training dataset of examples of the type of event to be detected, which can be challenging, especially in the case of rare events. In addition, such an approach is also unable to detect and adapt to new types of events of interest.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
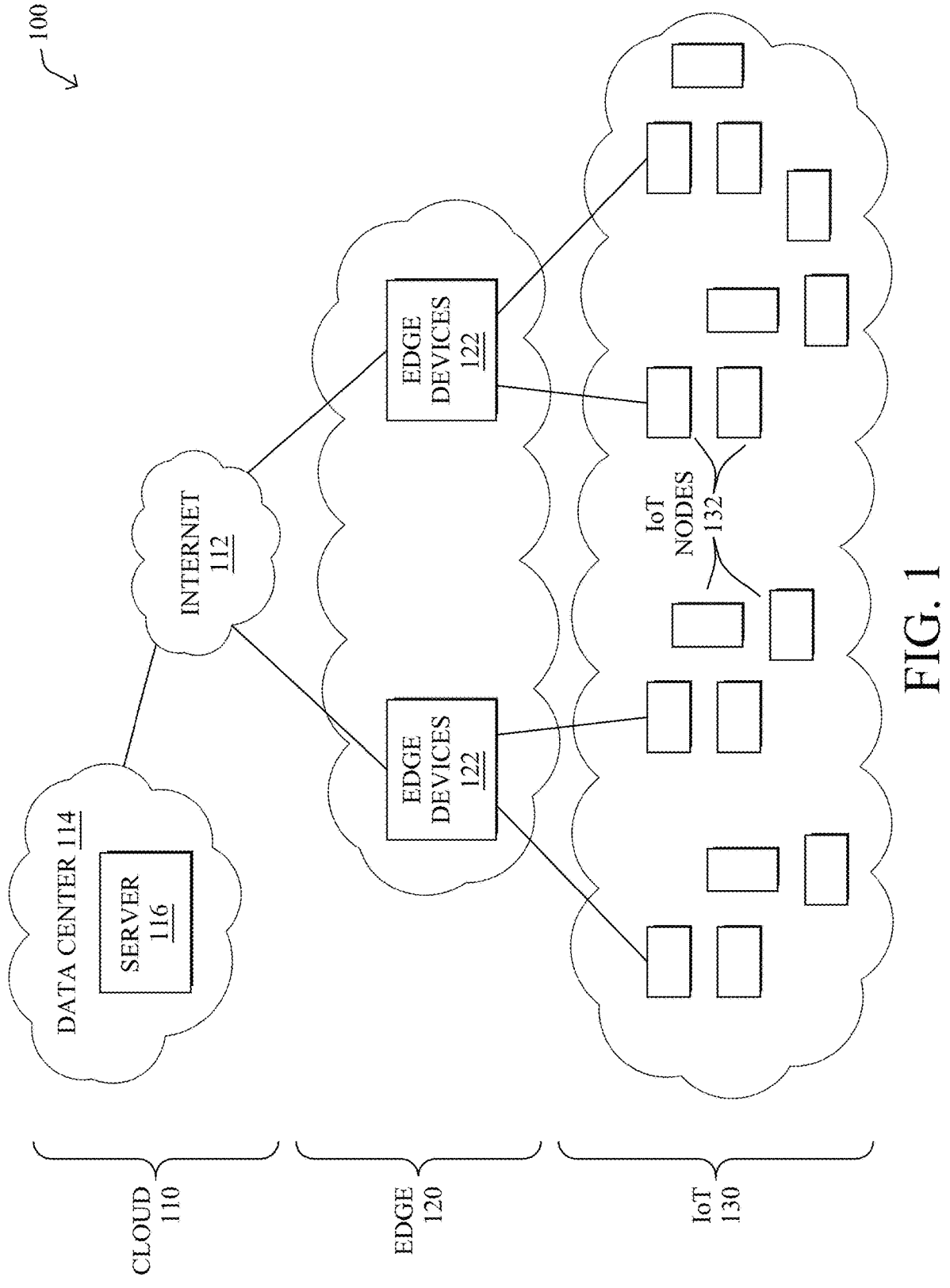
FIG. 1 illustrate an example network.

According to one or more embodiments of the disclosure, a device represents spatial characteristics of an object depicted in video data over time as one or more timeseries. The device associates different portions of the one or more timeseries with behavioral regimes of the object. The device generates ground truth labels for frames of the video data based on changes in the behavioral regimes of the object associated with those frames. The device trains a self-supervised model to detect an event depicted in the video data using the ground truth labels and their associated frames.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
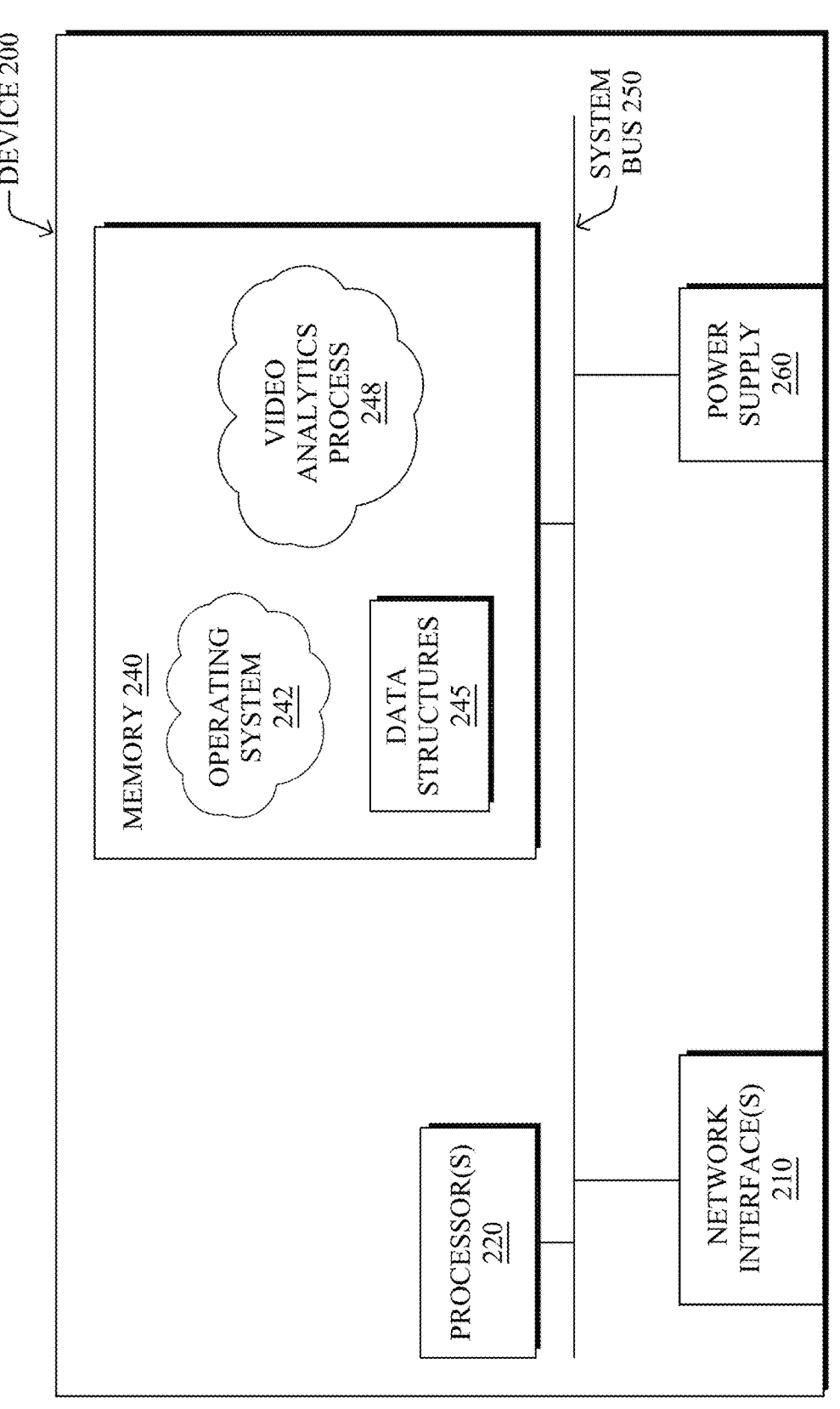
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/ IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
FIG. 3 illustrates an example system for performing video analytics.
Figure 3:
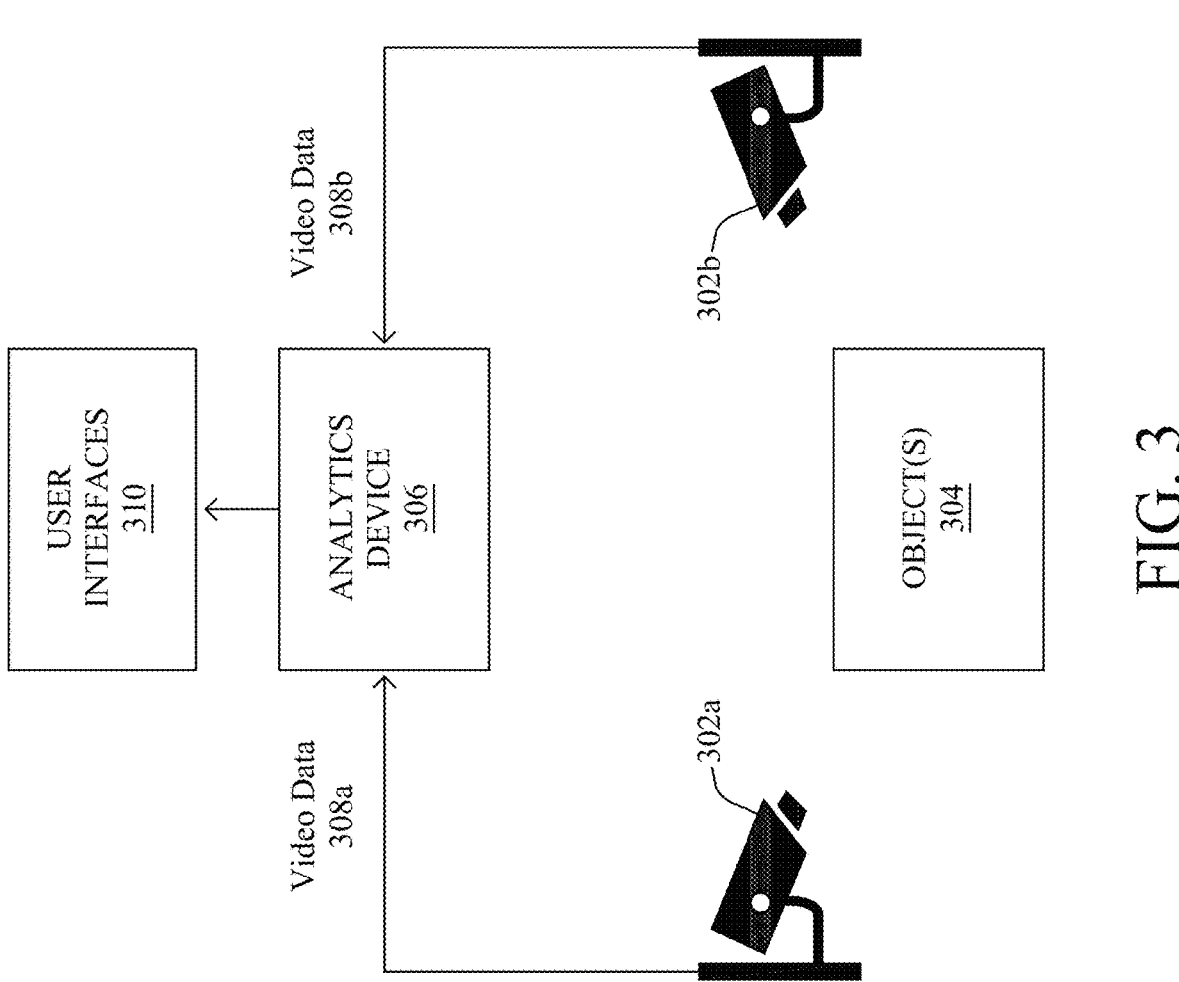

FIG. 3 illustrates an example system 300 for performing video analytics, as described in greater detail above. As shown, there may be any number of cameras 302 deployed to a physical area, such as cameras 302*a*-302*b*. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302*a*-302*b* may generate and send video data 308*a*-308*b*, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308*a*-308*b* for display to one or more user interfaces 310, as well as to analyze the video data for events that may be of interest to a potential user. To this end, analytics device 306 may perform object detection on video data 308*a*-308*b*, to detect and track any number of objects 304 present in the physical area and depicted in the video data 308*a*-308*b*. In some embodiments, analytics device 306 may also perform object re-identification on video data 308*a*-308*b*, allowing it to recognize an object 304 in video data 308*a* as being the same object in video data 308*b* or vice-versa.

As noted above, a key challenge with respect to video analytics is the detection of events that may be of relevance to a user. Traditional efforts to detect relevant events in captured video have focused on supervised learning, which requires a training dataset of labeled examples, in order to train a model. For instance, consider the example of two vehicles colliding with one another. In order to detect this event from the captured video data, hundreds or even thousands of example video clips depicting vehicular collisions that have been labeled as such. While this approach can result in a model that is able to detect vehicular collisions under certain circumstances, it also suffers from multiple disadvantages:

1. The training process can be quite cumbersome—In addition to requiring many labeled examples of a particular type of event, which may not even be available, this approach also requires this to be repeated for each type of event to be detected.
2. The trained model is unlikely to detect and adapt to new types of events of interest—For instance, say the model was trained to detect vehicular collisions using training data only showing two cars colliding. However, after deployment, the video data analyzed by the model may depict any number of different types of vehicles (e.g., bicycles, motorcycles, busses, etc.). Consequently, the model may not be able to detect collisions between other types of vehicles that were not included in its training data.

Self-Supervised Learning for Video Analytics

The techniques introduced herein allow for the automated training and updating of machine learning/deep learning models for video analytics. In some aspects, such models may be trained by assessing behavioral regime changes of spatial timeseries for objects in the video, to label samples for the model training.

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various embodiments, a device represents spatial characteristics of an object depicted in video data over time as one or more timeseries. The device associates different portions of the one or more timeseries with behavioral regimes of the object. The device generates ground truth labels for frames of the video data based on changes in the behavioral regimes of the object associated with those frames. The device trains a self-supervised model to detect an event depicted in the video data using the ground truth labels and their associated frames.

Operationally, in various embodiments, the techniques herein propose detecting reflections in video data through video analytics process 248 being configured first to perform the following:

1. Representing the video data/stream(s) as a set of spatial timeseries; and
2. Analyzing those timeseries to detect behavioral regime changes.

In various embodiments, video analytics process 248 may begin by employing object (re)identification, to track the various object(s) depicted in the video data over time. For instance, a detected object may be any of the following, among others: a person, a vehicle, a package, a suitcase or other portable object, or the like. In some embodiments, video analytics process 248 may also identify a collection of multiple physical objects as a singular object for purposes of tracking an analysis.

Figure 4A:
FIGS. 4A-4B illustrate examples of the analysis of different frames of a video feed.
Figure 4B:

By way of example, FIGS. 4A-4B illustrate different frames 400, 410, respectively, of a video stream from a camera. As shown in FIG. 4A, video analytics process 248 may detect and track different people present in the physical location using a person (re)identification mechanism. Each detected person is shown in frame 400 as highlighted. In addition, video analytics process 248 may also detect clusters of people as separate objects for analysis, each of which is shown in frame 400 as circled.

In various embodiments, video analytics process 248 may, for any or all of the identified objects in the video data, compute their spatial characteristics. For instance, video analytics process 248 may compute the centroid of a certain object, its two-dimensional or three-dimensional coordinates, its shape, its kinematics information, its relative position and/or trajectory with respect to one or more other object(s), the constituent members of a cluster object, or other information regarding the characteristics of the object.

Generally, each timeseries computed by video analytics process 248 represents the spatial characteristics of its associated object (e.g., a singular object or cluster of objects) over time. A key observation herein is that different activities/behaviors performed by the object under analysis will also be reflected in its corresponding timeseries as a distinguishable pattern. For instance, the timeseries for a person standing relatively still for a period of time in the video data will be relatively constant. Conversely, a person playing basketball may have wide variations in their timeseries, as they transition between running, stopping, dribbling the ball, shooting the ball, etc. Each timeseries pattern is referred to herein as a "behavioral regime" as it corresponds to a different activity being performed by the object.

According to various embodiments, video analytics process 248 may detect events of interest in the video data based on the rate of regime changes of the object(s) under analysis. While it may be possible to simply apply anomaly detection to a timeseries to detect anomalous events, doing so could also inadvertently flag regime changes as anomalous, despite them being perfectly normal activities. For instance, as noted above, the spatial timeseries of a person running and then shooting a basketball may exhibit a regime change which might be viewed as anomalous by a traditional anomaly detector. Instead, video analytics process 248 may look to the rate of regime change of the one or more object(s), to identify events that may be of interest.

By way of example, as shown in FIG. 4A, assume that a player 402 has suddenly collapsed on the basketball court, indicating a potential medical emergency. In such a case, the timeseries of the player exhibit a very sudden regime change, due to the player going from running to laying down. This may be of particular interest when compared to that of the other objects, as the other players may not have initially noticed the collapsed player 402.

In addition, as shown in FIG. 4B, the spatial timeseries of the other objects will also exhibit rapid regime changes, as the other players begin to notice the collapsed player 402. Here, the other players may go from behavioral regimes corresponding to running, dribbling, etc. to standing around the collapsed player 402. From the perspective of the cluster objects, this also corresponds to a sudden merging of clusters of people into a singular cluster around the collapsed player 402.

In various embodiments, to analyze the rate of regime changes in the timeseries, in some embodiments, video analytics process 248 may compute the derivatives of the timeseries and compare them to one or more threshold values. Thus, if the derivative of the timeseries exceeds such a threshold, this may indicate a rapid transition to a new regime, which could then be reported to a user interface as an event of interest.

Figure 5:
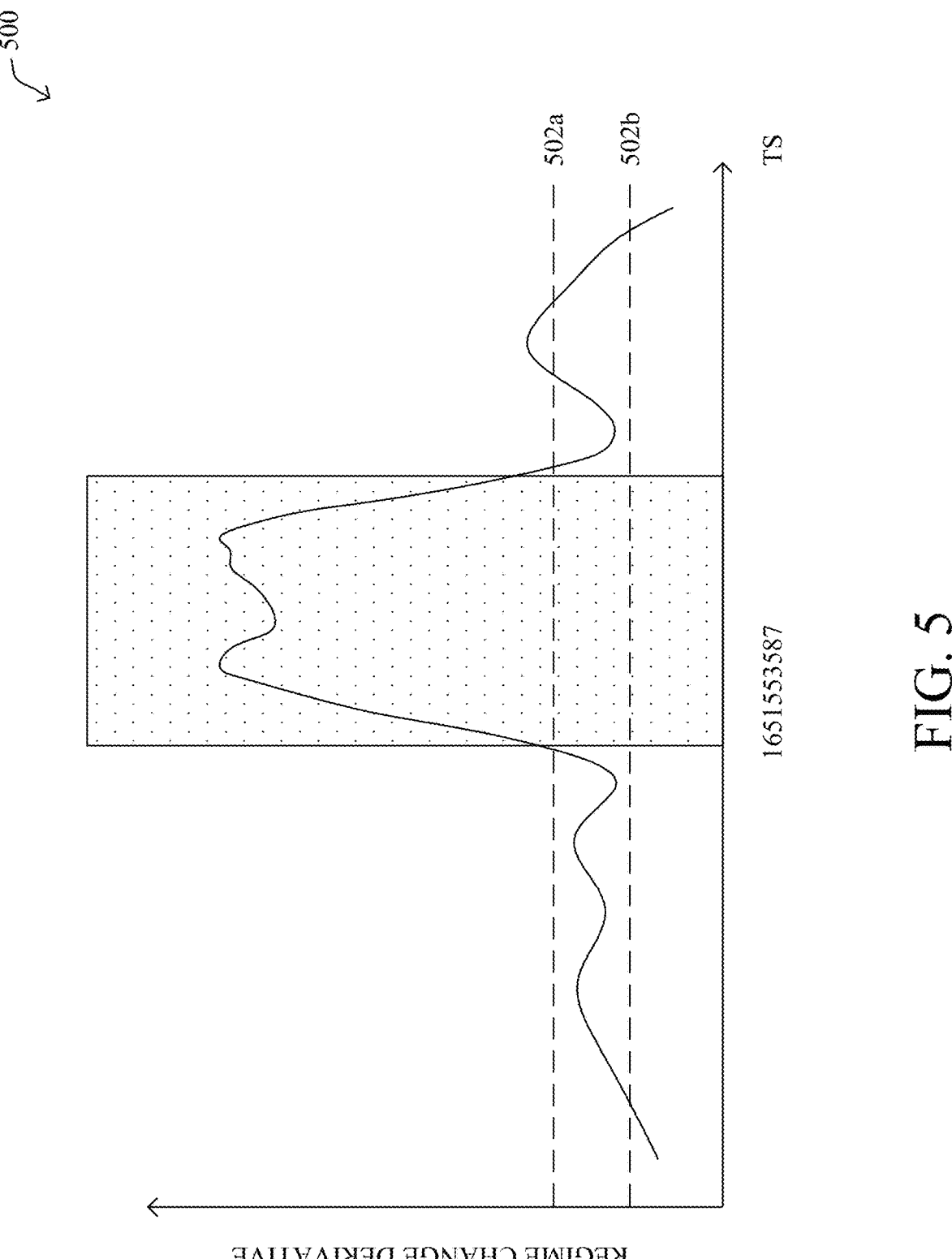
FIG. 5 illustrates an example plot of the regime change derivative for a timeseries.

For instance, FIG. 5 illustrates an example plot 500 of the regime change derivative for a timeseries, according to various embodiments. As shown, assume that there exists a baseline range between thresholds 502a-502b for the regime change derivative of a particular timeseries over time (e.g., a timeseries labeled with the identifier '1651553587'), such as for the player 402 shown in FIGS. 4A-4B. In such a case, when the regime change derivative exceeds threshold 502a, such as due to the player suddenly collapsing, video analytics process 248 may deem this an event of interest and raise an alert to a user interface for further review. Such thresholds may be set manually, based on a percentile or other distribution of values, or the like.

While the above approach is able to identify conditions within the video data that may be of interest or concern to a user of the video analytics system, such timeseries analysis is not without cost. Indeed, the (near-)real-time timeseries analysis is very computationally expensive. This could, for instance, limit the implementation of the timeseries analysis to computing devices with more resources, such as cloud servers. Thus, reducing the computational load could not only free up resources for the device performing the timeseries extraction and analysis, but also opens up the possibility of deploying the analytics to devices with fewer resources, such as networking devices at the edge of the local network or deeper into the network, as well.

According to further embodiments, the timeseries analysis above can also be leveraged to train a self-supervised model to perform video analytics (e.g., classification of video). To do so, video analytics process 248 may automatically use the results of this analysis to label frames of the video data, thereby constructing a training dataset on which a self-supervised machine/deep learning model may be trained.

Figure 6:
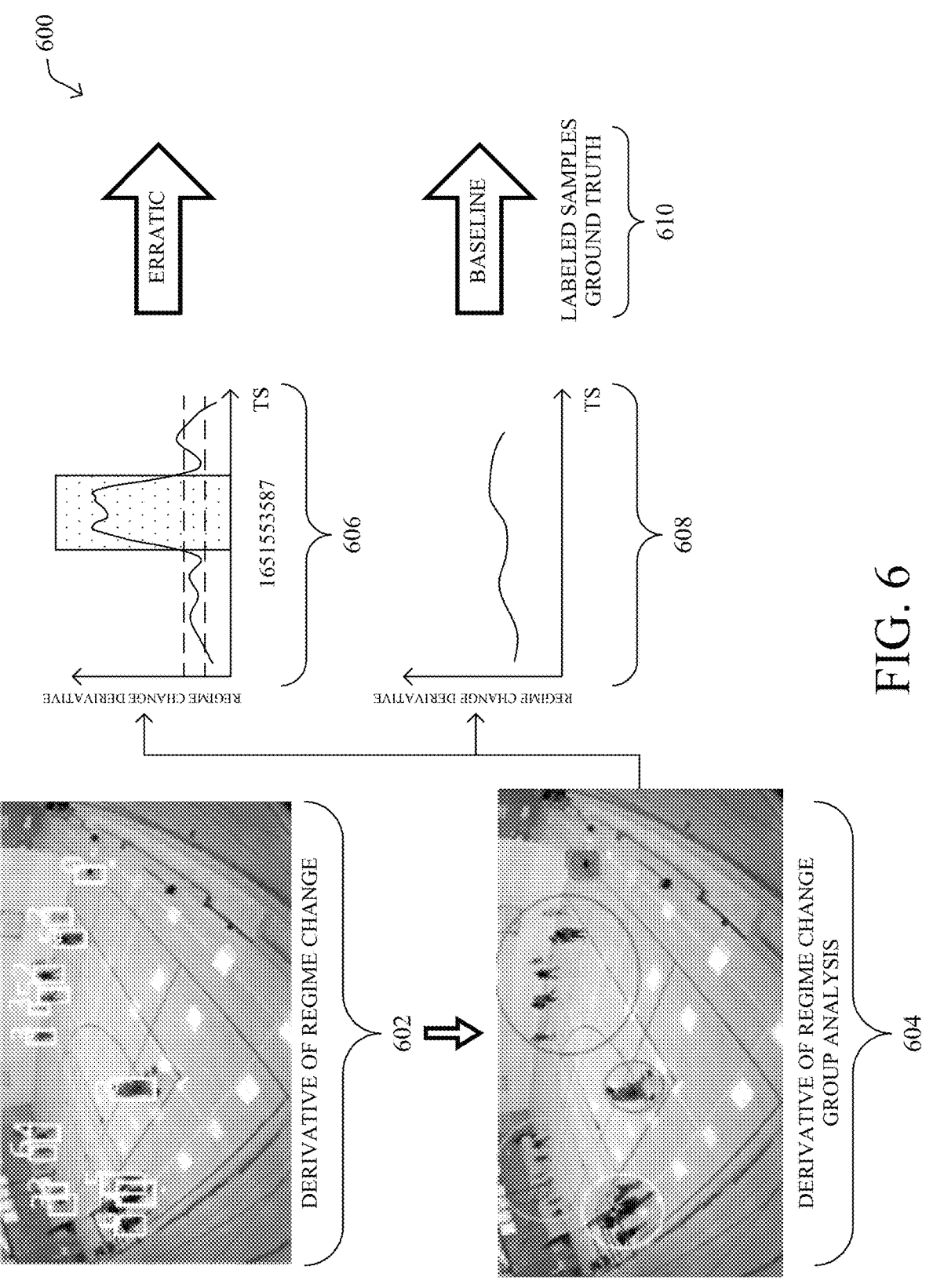
FIG. 6 illustrates an example of the generation of ground truth labels based on timeseries regime change information for video data.

By way of example, FIG. 6 illustrates an example 600 of the generation of ground truth labels based on timeseries regime change information for video data, in various embodiments. Continuing the prior example of the captured video depicting a person collapsing while playing basketball, video analytics process 248 may first identify and track the various objects (e.g., people) in the video data and represent their spatial characteristics as timeseries. In turn, video analytics process 248 may then identify regime changes present in these timeseries, such as through the computation and analysis of their respective regime change derivative 602.

In some embodiments, video analytics process 248 may compute not only the derivative of regime change for each individual object/person in the video data, but also for the various groups of objects/people that may be present in the video data. Doing so will likewise yield the corresponding derivatives 604 for the groups, as well.

As shown in FIG. 6, assume now that the behavioral regime change derivatives for any of derivatives 602, 604 fall into two distinct categories: erratic/anomalous behavior and baseline behavior. For instance, plot 606 of a first regime change derivative may indicate a significant change in the behavioral regimes of a specific person or group, such as the player that has collapsed. In contrast, plot 608 of a second regime change derivative may lack any rapid regime changes and represent baseline behavior, such as in the case of another player. In various embodiments, video analytics process 248 may use these two categories as ground truth labels to label the frames of the analyzed video data, accordingly, thereby forming a set 610 of labeled samples (e.g., frames, clips, or other portions of the video data) that have been labeled as depicting either 'erratic' or 'baseline' behaviors.

Figure 7:
FIG. 7 illustrates an example of using ground truth labels and self-supervised learning to train a machine learning model.

In various embodiments, video analytics process 248 may then use the ground truth-labeled samples in set 610 as training data for a self-supervised model. More specifically, as shown in example 700 in FIG. 7, video analytics process 248 may perform self-supervised model training 704 using the set 610 of samples that have been labeled as depicting erratic or baseline behaviors. As a result, video analytics process 248 will have trained a self-supervised machine learning (or deep learning) model 706 that is capable of recognizing erratic or baseline behaviors within video data and classifying the frames of the video data as such.

As would be appreciated, the specific type of trained model may be selected as desired. For instance, one example type of model that is particularly suitable for purposes of video analytics is convolutional neural networks (CNNs). Deep CNNs are a specialized form of CNNs that may also be well suited for such a task. However, other types of models could also be used, depending on the specific circumstances.

As a result of the training of model 706, model 706 is now able to make the same inferences about further video data as that of the timeseries analysis described previously. However, its execution is less resource intensive, leading to the potential to deploy model 706 closer to the camera(s) that captured the video data in the network, such as on an edge device, a particular router or switch, or the like. In addition, in some embodiments, this also afford the system the potential ability to switch over to using model 706 to analyze further video data, in lieu of continuing its behavioral regime change analysis.

Figure 8:
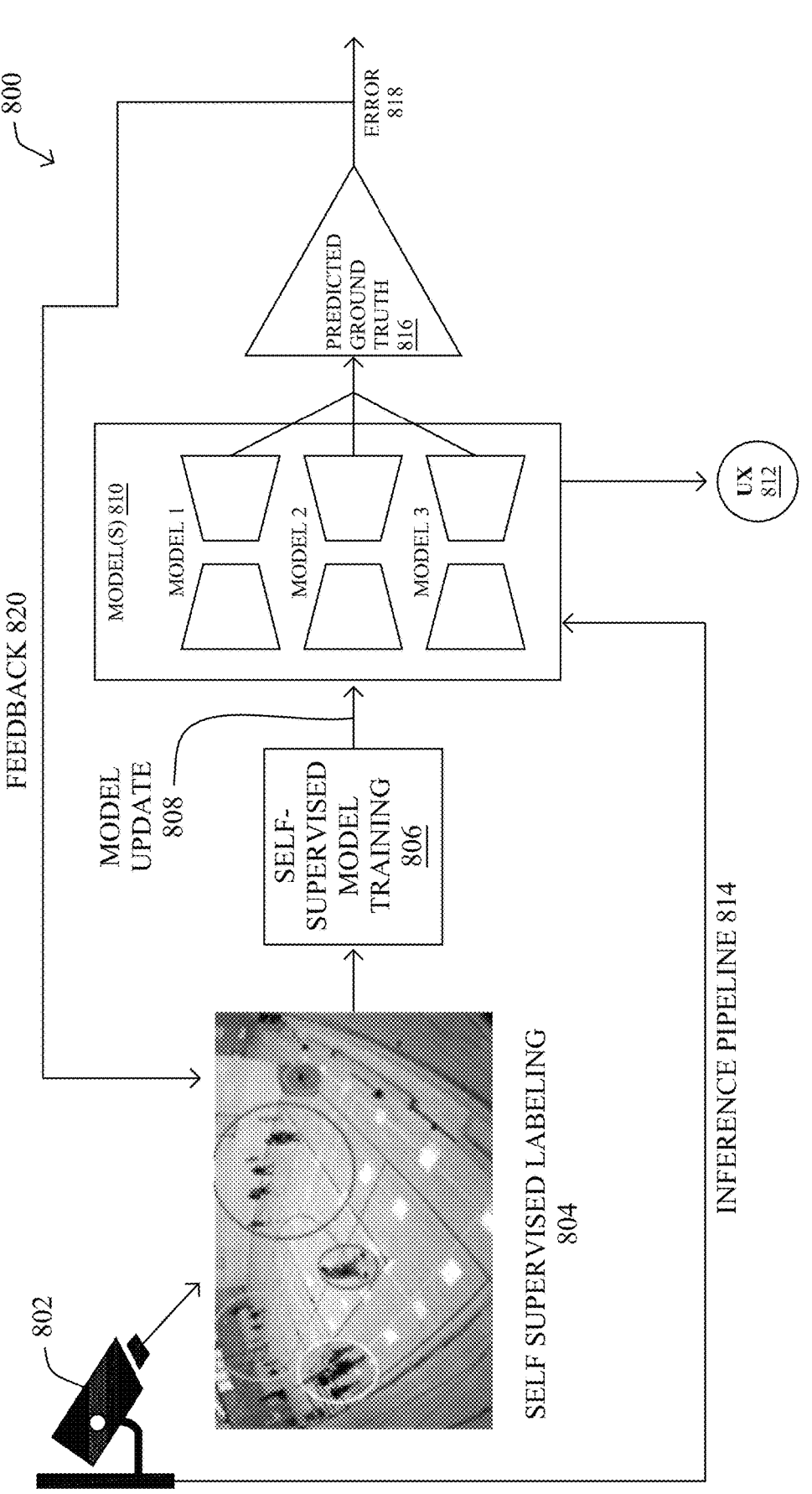
FIG. 8 illustrates an example architecture for using feedback to refine model training.

According to various embodiments, FIG. 8 illustrates an example architecture 800 for using feedback to refine model training. While the automatic labeling of the video data and training of a self-supervised model can lead to the training of a model that is quite capable of making inferences about its input video data, it is also possible that its training data also included mislabeled samples, for whatever reason. Thus, video analytics process 248 may also implement architecture 800, which allows the self-supervised model to be further refined over time, leading to better inference/classification results by the video analytics system.

As shown, one or more cameras 802 deployed to a particular location may capture video data therefrom, which video analytics process 248 may use to perform its self-supervised labeling 804 of the video data. Then, as detailed above, video analytics process 248 may perform its self-supervised model training 806 to train one or more models 810 to detect specific events or other conditions within the video data from camera(s) 802, using the approaches described with respect to FIG. 8.

Once model(s) 810 have been trained, they may be deployed as part of an inference pipeline 814 that analyzes further video data from camera(s) 802. Any inferences (e.g., classifications) of that video data can then be provided to a user interface (UX) 812 for review by a user. For instance, in the case of the player collapsing, such an indication may take the form of an alert that flags a portion of the video data from camera(s) 802 as depicting erratic behavior. By drawing attention to this, the user of UX 812 can then take an appropriate response, such as by contacting emergency medical services. In a further embodiment, video analytics process 248 may also initiate these types of response, automatically, as well.

Now, it may very well be the case that model(s) 810 make an incorrect inference about the video data from camera(s) 802 from time to time. In various embodiments, video analytics process 248 may also make a comparison 816 between the inference/prediction by model(s) 810 and the ground truth for the portion of the video data analyzed by model(s) 810. Such ground truth could be obtained, for instance, via UX 812 or by continuing to perform labeling 804 and comparing the labels to the outputs of the existing model(s) 810 for that same portion of video data. If there is a discrepancy, such a discrepancy could then be used as feedback 820 to trigger retraining of model(s) 810 and the generation of a model update 808 for model(s) 810.

Figure 9:
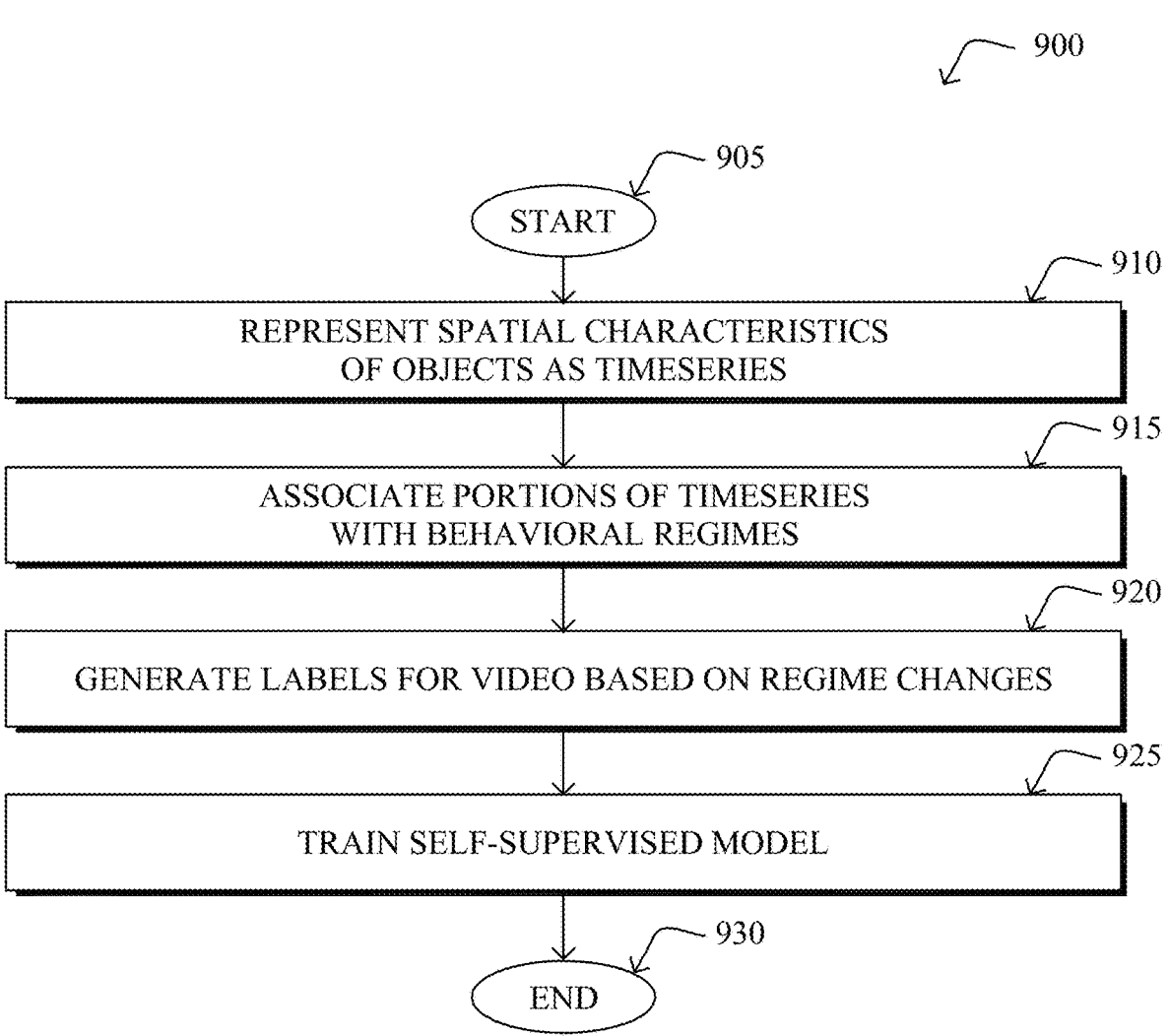
FIG. 9 illustrates an example simplified procedure for self-supervised learning for video analytics.

FIG. 9 illustrates an example simplified procedure 900 (e.g., a method) for self-supervised learning for video analytics, in accordance with one or more embodiments described herein. For example, a non-generic, specifically configured device (e.g., device 200) may perform procedure 900 by executing stored instructions (e.g., video analytics process 248). The procedure 900 may start at step 905, and continues to step 910, where, as described in greater detail above, the device may represent spatial characteristics of an object depicted in video data over time as one or more timeseries. In some embodiments, the spatial characteristics comprise detected centroids of the object. In one embodiment, the video data is captured by one or more cameras in a particular location. In various embodiments, the object is a person or a vehicle. In further embodiments, the device is an edge device in a network or a remote computing device (e.g., a remote server).

At step 915, as detailed above, the device may associate different portions of the one or more timeseries with behavioral regimes of the object. In various embodiments, the behavioral regimes comprise different patterns of the one or more timeseries associated with the object performing various actions. In some embodiments, the device may detect the regime changes by computing the regime change derivatives of the timeseries from step 910.

At step 920, the device may generate ground truth labels for frames of the video data based on changes in the behavioral regimes of the object associated with those frames, as described in greater detail above. In one embodiment, the ground truth labels indicate that anomalous behavior of the object is depicted in the frames.

At step 925, as detailed above, the device may train a self-supervised model to detect an event depicted in the video data using the ground truth labels and their associated frames. In various embodiments, the device may use the self-supervised model to classify further video data, in lieu of assessing behavioral regime changes of objects in the further video data. In further embodiments, the device may also make a determination that a classification by the self-supervised model of the further video data does not match a ground truth and initiate an update to the self-supervised model based on the determination. In another embodiment, the device may provide an indication of a classification of the further video data by the self-supervised model to a user interface for display.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for self-supervised learning for video analytics, it is to be understood that various other adaptations and modifications may be made within the spirit and scope of the embodiments herein. For example, while certain embodiments are described herein with respect to specific use cases for the techniques herein, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

representing, by a device, spatial characteristics of an object depicted in video data over time as one or more timeseries;

associating, by the device, different portions of the one or more timeseries with behavioral regimes of the object;

detecting, by the device, an event in the video data based on a rate of change of the behavioral regimes of the object;

generating, by the device, ground truth labels for frames of the video data based on the rate of change of the behavioral regimes of the object; and training, by the device using a machine learning training framework executing on one or more processors, a self-supervised model using the ground truth labels and their associated frames.

2. The method as in claim 1, wherein the spatial characteristics comprise detected centroids of the object.

3. The method as in claim 1, wherein the behavioral regimes comprise different patterns of the one or more timeseries associated with the object performing various actions.

4. The method as in claim 1, wherein the video data is captured by one or more cameras in a particular location.

5. The method as in claim 1, further comprising:

using, by the device, the self-supervised model to classify further video data, in lieu of assessing behavioral regime changes of objects in the further video data.

6. The method as in claim 5, further comprising:

making, by the device, a determination that a classification by the self-supervised model of the further video data does not match a ground truth; and initiating, by the device, an update to the self-supervised model based on the determination.

7. The method as in claim 5, further comprising:

providing, by the device, an indication of a classification of the further video data by the self-supervised model to a user interface for display.

8. The method as in claim 1, wherein the object is a person or a vehicle.

9. The method as in claim 1, wherein the ground truth labels indicate that anomalous behavior of the object is depicted in the frames.

10. The method as in claim 1, wherein the device is an edge device in a network.

11. An apparatus, comprising:

a network interface to communicate with a computer network;

a processor coupled to the network interface; and a memory configured to store instructions that, when executed by the processor, configure the processor to:

represent spatial characteristics of an object depicted in video data over time as one or more timeseries;

associate different portions of the one or more timeseries with behavioral regimes of the object;

determine a rate of change of the behavioral regimes of the object;

generate ground truth labels for frames of the video data based on the rate of change of the behavioral regimes of the object; and train, using a machine learning training framework, a self-supervised model to detect an event depicted in the video data using the ground truth labels and their associated frames.

12. The apparatus as in claim 11, wherein the spatial characteristics comprise detected centroids of the object.

13. The apparatus as in claim 11, wherein the behavioral regimes comprise different patterns of the one or more timeseries associated with the object performing various actions.

14. The apparatus as in claim 11, wherein the video data is captured by one or more cameras in a particular location.

15. The apparatus as in claim 11, wherein the instructions further configure the processor to:

use the self-supervised model to classify further video data, in lieu of assessing behavioral regime changes of objects in the further video data.

16. The apparatus as in claim 15, wherein the instructions further configure the processor to:

make a determination that a classification by the self-supervised model of the further video data does not match a ground truth; and initiate an update to the self-supervised model based on the determination.

17. The apparatus as in claim 15, wherein the instructions further configure the processor to:

provide an indication of a classification of the further video data by the self-supervised model to a user interface for display.

18. The apparatus as in claim 11, wherein the object is a person or a vehicle.

19. The apparatus as in claim 11, wherein the ground truth labels indicate that anomalous behavior of the object is depicted in the frames.

20. A tangible, non-transitory, computer-readable medium storing program instructions that cause a device to execute a process comprising:

representing, by the device, spatial characteristics of an object depicted in video data over time as one or more timeseries;

associating, by the device, different portions of the one or more timeseries with behavioral regimes of the object;

determining a rate of change of the behavioral regimes of the object;

generating, by the device, ground truth labels for frames of the video data based on the rate of change of the behavioral regimes of the object associated with those frames; and training, by the device using a machine learning training framework executing on one or more processors, a self-supervised model to detect an event depicted in the video data using the ground truth labels and their associated frames.

* * * * *